(12) United States Patent
Bauerle et al.

(10) Patent No.: US 8,250,911 B2
(45) Date of Patent: Aug. 28, 2012

(54) CONTROL MODULE RESPONSE TESTING SYSTEMS AND METHODS

(75) Inventors: Paul A. Bauerle, Fenton, MI (US);
Marco J. Gatti, Southgate, MI (US);
Charles E Rose, Kennebunk, ME (US)

(73) Assignee: GM Global Technology Operations LLC

( * ) Notice: Subject to any disclaimer, the term of this patent is extended or adjusted under 35 U.S.C. 154(b) by 143 days.

(21) Appl. No.: 12/903,649

(22) Filed: Oct. 13, 2010

(65) Prior Publication Data

US 2012/0036922 A1 Feb. 16, 2012

Related U.S. Application Data

(60) Provisional application No. 61/373,552, filed on Aug. 13, 2010.

(51) Int. Cl.
*G01M 15/00* (2006.01)
(52) U.S. Cl. .................................... 73/114.36
(58) Field of Classification Search ................ 73/114.36
See application file for complete search history.

(56) References Cited

U.S. PATENT DOCUMENTS

| | | | |
|---|---|---|---|
| 6,486,661 B2 * | 11/2002 | Chia et al. ..................... | 324/225 |
| 7,080,549 B2 * | 7/2006 | Shao et al. ................. | 73/114.36 |
| 7,717,085 B1 * | 5/2010 | Bauerle .......................... | 123/399 |
| 7,761,251 B2 * | 7/2010 | Bauerle ........................... | 702/89 |

OTHER PUBLICATIONS

SAE International, SAE J2716, Surface Vehicle Information Report, "SENT—Single Edge Nibble Transmission for Automotive Applications", Copyright 2005 SAE International, Date Published: Feb. 2008, pp. 1-15.
SAE International, Appendix to SAE J2716 Information Report, pp. 1-3.
Anon., "Two-wire Single Edge Nibble Transmission (SENT) Interface system", Research Disclosure, 2006, NUMB 508, ISSN: 0374-4353, pp. 1135.

\* cited by examiner

*Primary Examiner* — Freddie Kirkland, III

(57) ABSTRACT

A testing module includes a first input, a second input, an output, a decoder module, an analog to digital (A/D) converter, and an output generator module. The testing module receives a throttle position signal from a throttle position sensor of a vehicle at the first input. The decoder module generates a first throttle position based on a length of at least one pulse in the throttle position signal. The A/D converter generates a second throttle position based on the throttle position signal. The testing module receives user input at the second input. The output generator module generates a test signal in a single edge nibble transmission (SENT) format based on the user input and one of the first and second throttle positions. The testing module outputs the test signal to a control module of the vehicle at the output.

20 Claims, 7 Drawing Sheets

US 8,250,911 B2

CONTROL MODULE RESPONSE TESTING SYSTEMS AND METHODS

CROSS-REFERENCE TO RELATED APPLICATIONS

This application claims the benefit of U.S. Provisional Application No. 61/373,552, filed on Aug. 13, 2010. The disclosure of the above application is incorporated herein by reference in its entirety.

FIELD

The present disclosure relates to internal combustion engines and more particularly to vehicle diagnostic systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine.

An engine control module (ECM) controls the torque output of the engine. The ECM may control the torque output of the engine via the throttle valve, the fuel injectors, and/or one or more other suitable engine actuators.

The ECM may control the torque output of the engine based on one or more inputs. The inputs may include, but are not limited to, inputs from various sensors. For example only, the sensors may include a mass air flow (MAF) sensor, an intake air temperature (IAT) sensor, one or more throttle position (TP) sensors, and/or one or more other sensors.

SUMMARY

A testing module includes a first input, a second input, an output, a decoder module, an analog to digital (A/D) converter, and an output generator module. The testing module receives a throttle position signal from a throttle position sensor of a vehicle at the first input. The decoder module generates a first throttle position based on a length of at least one pulse in the throttle position signal. The A/D converter generates a second throttle position based on the throttle position signal. The testing module receives user input at the second input. The output generator module generates a test signal in a single edge nibble transmission (SENT) format based on the user input and one of the first and second throttle positions. The testing module outputs the test signal to a control module of the vehicle at the output.

A method includes: receiving a throttle position signal from a throttle position sensor of a vehicle at a first input of a testing module; generating a first throttle position based on a length of at least one pulse in the throttle position signal using the testing module; generating a second throttle position based on the throttle position signal using the testing module; receiving user input at a second input of the testing module; generating a test signal in a single edge nibble transmission (SENT) format based on the user input and one of the first and second throttle positions; and outputting the test signal to a control module of the vehicle at an output of the testing module.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
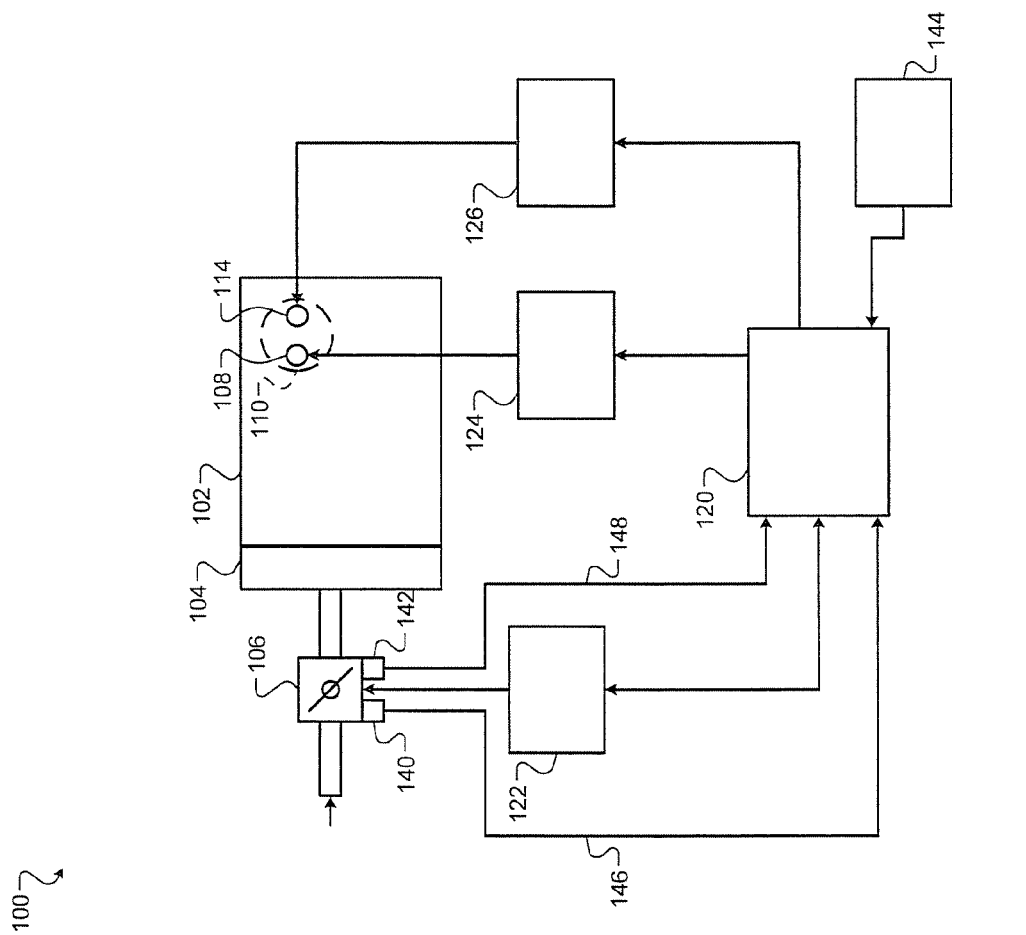
FIG. 1 is a functional block diagram of an example engine system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A sensor of a vehicle measures a parameter and generates a signal based on the parameter. For example, a throttle position sensor measures a throttle position and generates a throttle position signal based on the throttle position. A control module, such as an engine control module, receives the signal.

A testing module or device also receives the signal. The testing module is adapted to receive the signal either in an analog form or in a single edge nibble transmission (SENT) form. Generally, the SENT form involves generating a predetermined number of pulses in a signal in a predetermined order, then repeating the predetermined order.

The testing module determines the parameter measured by the sensor based on one or more pulses in the signal. The testing module generates a test signal in the SENT form based on the parameter. The testing module generates the test signal further based on user input. The user input may specify how the testing module should generate one or more pulses in the test signal.

The testing module outputs the test signal to the control module. The control module selectively diagnoses the presence of one or more hardware input output (HWIO) faults based on the test signal. Based on the user input and therefore how the testing module generates the test signal based on the user input, the user can verify whether the control module responds appropriately to the test signal.

Referring now to FIG. 1, a functional block diagram of an example engine system 100 is presented. An engine 102 generates drive torque for a vehicle. While the engine 102 is shown and will be discussed as a spark-combustion internal combustion engine (ICE), the engine 102 may include another suitable type of engine, such as a compression-combustion ICE. The vehicle may additionally or alternatively include one or more electric motors (or motor-generators).

Air is drawn into the engine 102 through an intake manifold 104. A throttle valve 106 varies air flow into the engine 102. One or more fuel injectors, such as fuel injector 108, mix fuel with the air to form an air/fuel mixture. The air/fuel mixture is combusted within a cylinder 110. Although the engine 102 is depicted as including one cylinder, the engine 102 may include more than one cylinder. Combustion may be initiated, for example, by spark provided by a spark plug 114 or in another suitable manner.

An engine control module (ECM) 120 controls the throttle valve 106, the fuel injector 108, and the spark plug 114. More specifically, a throttle actuator module 122, a fuel actuator module 124, and a spark actuator module 126 control the throttle valve 106, the fuel injector 108, and the spark plug 114, respectively, based on signals from the ECM 120. While not shown, the ECM 120 may also control other engine actuators, such as one or more camshaft phasers, an exhaust gas recirculation (EGR) valve, a boost device (e.g., a turbocharger or a supercharger), and/or one or more other engine actuators.

The ECM 120 may control the torque output of the engine 102 based on one or more driver inputs, such as an accelerator pedal position (APP), a brake pedal position (BPP), a cruise control input, and/or other suitable driver inputs. The ECM 120 may also control the torque output of the engine 102 based on signals from one or more sensors, such as a first throttle position sensor 140, a second throttle position sensor 142, and one or more other sensors 144. The other sensors 144 may include, for example, a mass air flowrate (MAF) sensor, an intake air temperature (IAT) sensor, an engine coolant temperature sensor, an engine oil temperature sensor, and/or one or more other suitable sensors.

The first throttle position sensor 140 measures position of the throttle valve 106 and generates a first throttle position signal 146 based on the position. The second throttle position sensor 142 measures position of the throttle valve 106 and generates a second throttle position signal 148 based on the position. The first and second throttle position signals 146 and 148 may be transmitted via separate electrical connections (e.g., wires) as shown in the example of FIG. 1. For example only, the first and second throttle position signals 146 and 148 may be transmitted via separate electrical connections in implementations where the first and second throttle position signals 146 and 148 are analog signals. In various implementations, the first and second throttle position signals 146 and 148 may both be transmitted via one wire. For example only, the first and second throttle position signals 146 and 148 may be transmitted via one wire in implementations where the first and second throttle position signals 146 and 148 are generated based on the single edge nibble transmission (SENT) signal generation protocol.

Figure 2:
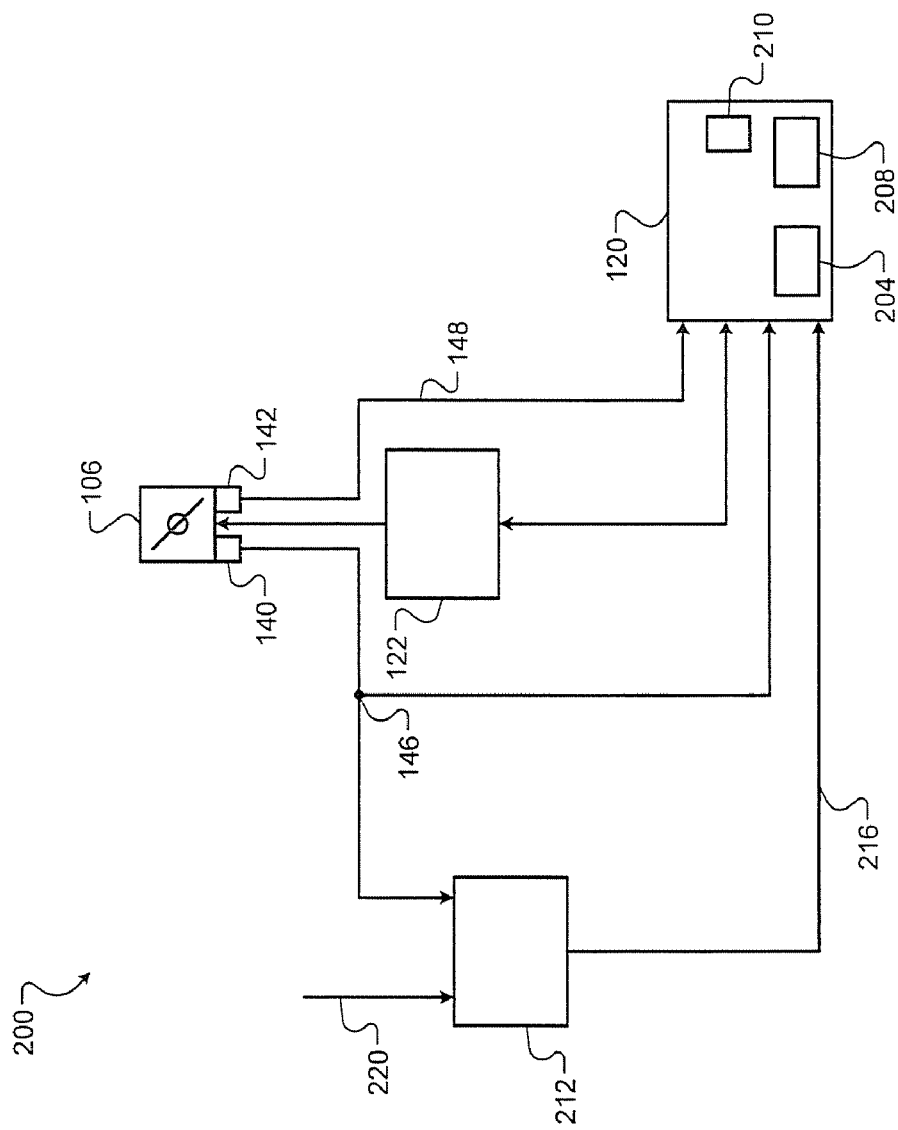
FIG. 2 is a functional block diagram of an example engine control module (ECM) diagnostic validation system according to the principles of the present disclosure.

Referring now to FIG. 2, a functional block diagram of an example ECM diagnostic validation system 200 is presented. The first and second throttle position sensors 140 and 142 provide the first and second throttle position signals 146 and 148 to the ECM 120. The ECM 120 includes a hardware input output (HWIO) module 204 and a diagnostic module 208.

The HWIO module 204 selectively diagnoses the presence of one or more types of HWIO faults based on the first throttle position signal 146. Various types of HWIO faults for which the HWIO module 204 monitors are discussed in detail below. The HWIO module 204 may selectively adjust the first throttle position signal 146 and/or take one or more other remedial actions when one or more HWIO faults are present.

The diagnostic module 208 selectively diagnoses the presence of one or more service faults based on the first throttle position signal 146. The diagnostic module 208 may selectively diagnose the presence of a given service fault further based on one or more other signals or values. The service faults may each be associated with a predetermined type of fault to be detected under an applicable fault diagnostic standard, such as the on-board diagnostic II (OBDII) fault diagnostic standard. The diagnostic module 208 may indicate the presence of a service fault in diagnostic memory 210, such as by setting a predetermined code or location corresponding to the service fault in the diagnostic memory 210. A malfunction indicator lamp (MIL) (not shown) may be illuminated when one or more service faults are present.

The first throttle position signal 146 may be an analog signal or generated according to the SENT signal generation protocol. The SENT protocol is detailed in Society of Automotive Engineers (SAE) Information Report Reference Number J2716, entitled "SENT—Single Edge Nibble Transmission for Automotive Applications," which is incorporated herein by reference in its entirety. A sensor that generates a signal that conforms to the SENT protocol may be referred to as a sensor module and includes a processor and/or associated circuitry to generate the signal according to the SENT protocol. Such a sensor module may also be referred to as a smart sensor. For example only, if generating the first throttle position signal 146 according to the SENT protocol, the first throttle position sensor 140 can be referred to as a throttle position sensor module and/or as a smart throttle position sensor.

Figure 3:
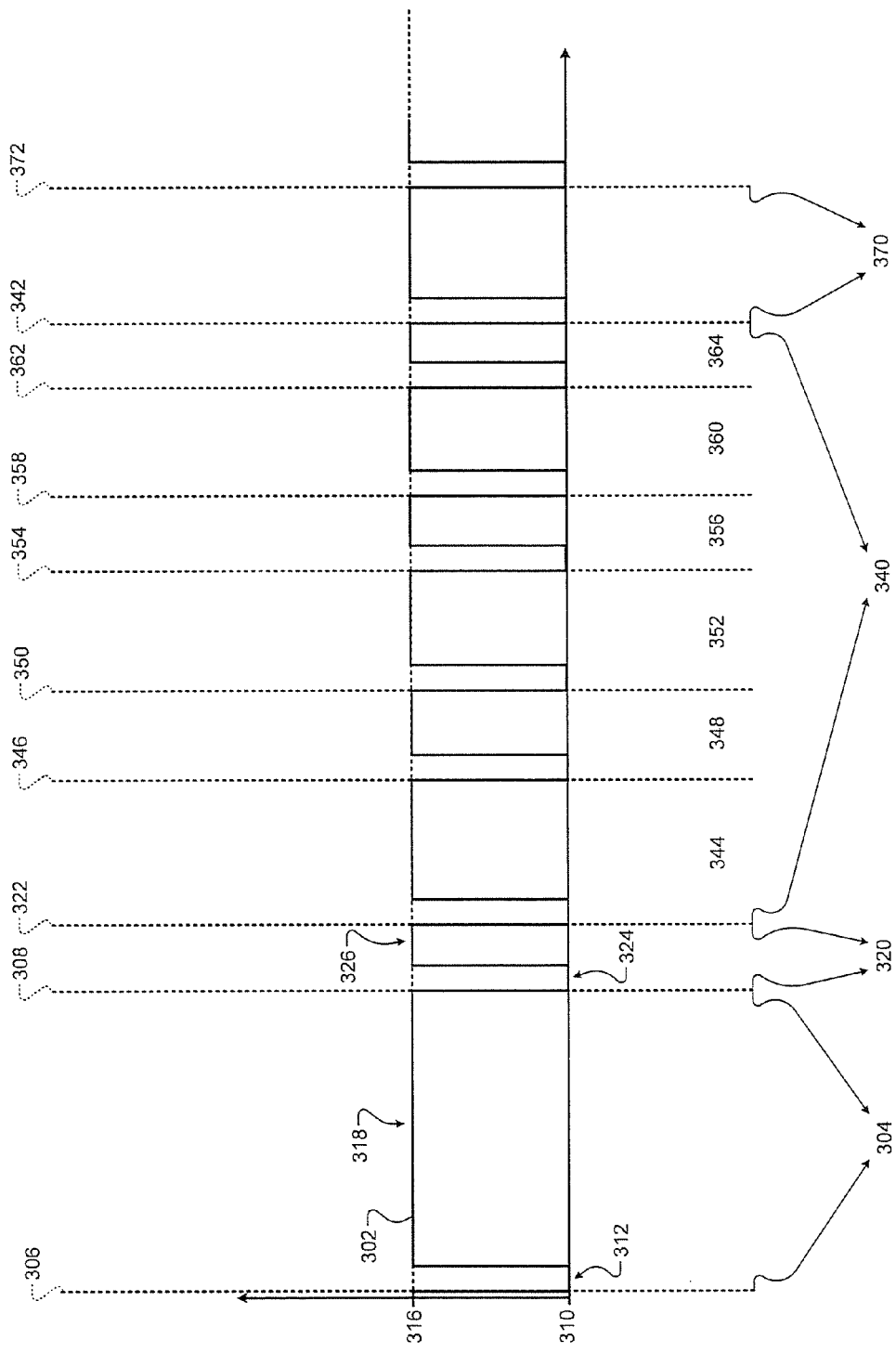
FIG. 3 is an example single edge nibble transmission (SENT) signal according to the principles of the present disclosure.

Referring now to FIG. 3, an example signal 302 generated by a transmitter (e.g., the first throttle position sensor 140, a testing module 212 discussed below, etc.) according to the SENT protocol is presented. Generally speaking, the SENT protocol involves generating a predetermined number of pulses in a signal (e.g., the example signal 302) in a predetermined order. After the predetermined number of pulses has been generated in the predetermined order, the predetermined order starts over. The predetermined number of pulses is generated in the predetermined order to complete one message.

The transmitter maintains the signal in a low state for a predetermined period after each falling edge in the signal before transitioning the signal back to a high state. The transmitter determines how long to maintain the signal in the high state to convey information specific to the present pulse in the predetermined order. The transmitter maintains the signal in the high state for the determined length of time. The transmitter transitions the signal to the low state when the determined length of time has passed, thereby creating the falling edge of the present pulse. The transmitter then maintains the signal in the low state for the predetermined period. The transmitter determines how long to maintain the signal in the high state to convey information specific to a next pulse in the predetermined order. Once the predetermined period has passed, the transmitter transitions the signal to the high state. The transmitter maintains the signal in the high state for the length of time determined for the next pulse. This process continues until one message is complete. The predetermined order then starts over for a next message. In various implementations, the low and high states may be reversed.

A receiver (e.g., the ECM 120) of the signal can determine a type of information conveyed via a given pulse of the signal based on where the given pulse falls in the predetermined order. The receiver can also determine what information is conveyed via the given pulse based on the period between two consecutive falling edges (i.e., the length of the given pulse) in the signal. Because the signal is maintained in the low state for the predetermined period after each falling edge, how long the signal is maintained in the high state is the only portion of each of the pulses that may vary from pulse to pulse. Accordingly, the receiver can alternatively determine what information is conveyed via the given pulse based on how long the signal is maintained in the high state for the given pulse.

The example of FIG. 3 illustrates one complete message generated in the example signal 302. For example only, in the example of FIG. 3, the predetermined number of pulses is 4, and the one message includes the 4 pulses. The predetermined number of pulses and the predetermined order of the pulses is the same from message to message under the SENT protocol. The length of one or more of the pulses may vary from message to message.

Each of the four pulses is defined by two falling edges in the example signal 302. For example, a first pulse 304 in the predetermined order is defined by time 306 and time 308. Time 306 corresponds to the falling edge of a fourth pulse of a last message transmitted via the example signal 302 immediately before the message shown in FIG. 3. Time 308 corresponds to the falling edge of the first pulse 304. The first pulse 304 may be referred to as a timing pulse or a synchronization/calibration pulse.

The first pulse 304 is a predetermined total period in length. For example only, the predetermined total period may be 56 clock cycles of the transmitter. One clock cycle may also be referred to as a tick. Beginning at time 306, the example signal 302 is maintained in a low state 310 (e.g., 0 Volts) for the predetermined period as illustrated at 312. For example only, the predetermined period may be 5 clock cycles of the transmitter.

Once the predetermined period has passed after time 306, the example signal 302 is transitioned to a high state 316 (e.g., 5 Volts). As illustrated at 318, the example signal 302 is maintained in the high state 316 until the predetermined total period has passed after time 306. The receiver may determine the length of each clock cycle of the transmitter based on the length of the first pulse 304 and an expected length of the first pulse 304. Because the clock cycles of the transmitter may be different than a nominal clock cycle, the receiver may use the length of the first pulse 304 to normalize the length of the pulses in the example signal 302.

A second pulse 320 is defined by time 308 and time 322. Time 308 corresponds to the falling edge of the first pulse 304. Time 322 corresponds to the falling edge of the second pulse 320. The second pulse 320 may be referred to as a status/communication pulse.

As is the case after each falling edge, beginning at time 308, the example signal 302 is maintained in the low state 310 for the predetermined period. Maintenance of the example signal 302 in the low state 310 after the falling edge of the first pulse 304 is illustrated at 324. Once the predetermined period has passed after time 308, the example signal 302 is transitioned to the high state 316. The transmitter maintains the example signal 302 in the high state 316, as illustrated at 326, until transitioning the signal to the low state 310 at time 322.

The transmitter determines how long to maintain the example signal 302 in the high state 316 to convey various information via the second pulse 320. For example only, the various information for the second pulse 320 may include whether a fault is present, slow serial data transmission, and/or other suitable information. The transmitter may limit how long the example signal 302 is maintained in the high state 316 to not less than a predetermined minimum period and not greater than a predetermined maximum period. For example only, the predetermined minimum and maximum periods may be 12 clock cycles and 27 clock cycles, respectively, of the transmitter. The predetermined minimum period is greater than the predetermined period that the example signal 302 is maintained in the low state 310 after each falling edge.

A third pulse 340 is defined by time 322 and time 342. The third pulse 340 includes a predetermined number of sub-pulses. Each of the sub-pulses will be referred to as a nibble. For example only, the third pulse 340 includes 6 nibbles in the example of FIG. 3. The predetermined number of nibbles of the third pulse 340 may be greater than or less than six in various implementations. The third pulse 340 may referred to as a data pulse.

A first nibble 344 is defined by time 322 and time 346. Time 322 corresponds to the falling edge of the second pulse 320, and time 346 corresponds to the falling edge of the first nibble 344. A second nibble 348 is defined by time 346 and time 350. Time 346 corresponds to the falling edge of the first nibble 344, and time 350 corresponds to the falling edge of the second nibble 348. A third nibble 352 is defined by time 350 and time 354. Time 350 corresponds to the falling edge of the second nibble 348, and time 354 corresponds to the falling edge of the third nibble 352.

A fourth nibble 356 is defined by time 354 and time 358. Time 354 corresponds to the falling edge of the third nibble 352, and time 358 corresponds to the falling edge of the fourth nibble 356. A fifth nibble 360 is defined by time 358 and time 362. Time 358 corresponds to the falling edge of the fourth nibble 356, and time 362 corresponds to the falling edge of the fifth nibble 360. A sixth nibble 364 is defined by time 362 and time 342. Time 362 corresponds to the falling edge of the fifth nibble 360, and time 342 corresponds to the falling edge of the sixth nibble 364 and the end of the third pulse 340.

Beginning at the time of the falling edge of a previous pulse (or nibble), the transmitter maintains the example signal 302 in the low state 310 for the predetermined period before transitioning the example signal 302 to the high state 316 for each of the nibbles 344, 348, 352, 356, 360, and 364. The period that the example signal 302 is maintained in the high state 316 for each of the nibbles 344, 348, 352, 356, 360, and 364 is limited to not less than the predetermined minimum period and to not greater than the predetermined maximum period.

A first half of the nibbles 344, 348, 352, 356, 360, and 364 is used to convey a parameter determined using the transmitter. For example only, the first, second, and third nibbles 344, 348, and 352 may be used to convey an opening percentage or position of the throttle valve 106 if the transmitter is a throttle position sensor.

The transmitter determines a length of each of the first, second, and third nibbles 344, 348, and 352 based on the parameter. The parameter may be a parameter measured by the transmitter (e.g., throttle position) or determined based on the measured parameter (e.g., throttle opening percentage). The transmitter maintains the example signal 302 in the high state 316 for the first, second, and third nibbles 344, 348, and 352 based on the determined lengths, respectively, to convey the parameter.

A second half of the nibbles 344, 348, 352, 356, 360, and 364 is used to convey a complement of the first half of the nibbles 344, 348, 352. For example only, the fourth, fifth, and sixth nibbles 356, 360, and 364 may collectively be used to convey the one's compliment of first, second, and third nibbles 344, 348, and 352.

The transmitter determines the complement of the first half of the nibbles 344, 348, 352, 356, 360, and 364, collectively. The transmitter determines a length for each of the fourth, fifth, and sixth nibbles 356, 360, and 364 based on the complement. The transmitter maintains the example signal 302 in the high state 316 for the fourth, fifth, and sixth nibbles 356, 360, and 364 based on the determined lengths, respectively, to convey the complement.

A fourth pulse 370 is defined by time 342 and time 372. Time 342 corresponds to the falling edge of the sixth nibble 364 and to the end of the third pulse 340. Time 372 corresponds to the falling edge of the fourth pulse 370. Time 372 also corresponds to the end of the one message (and one complete iteration of the predetermined number of pulses in the predetermined order). The fourth pulse 370 may be referred to as an error correcting code (ECC) pulse.

Beginning at time 342, the example signal 302 is maintained in the low state 310 for the predetermined period. Once the predetermined period has passed after time 342, the example signal 302 is transitioned to the high state 316 for the fourth pulse 370. The transmitter determines how long to maintain the example signal 302 in the high state 316 to convey ECC data via the fourth pulse 370. For example only, the ECC data may include cyclical redundancy check (CRC), checksum data, and/or other suitable ECC data. The period that the example signal 302 is maintained in the high state 316 for the fourth pulse 370 is limited to not less than the predetermined minimum period and to not greater than the predetermined maximum period. After the falling edge of the fourth pulse 370, the transmitter starts the predetermined order over.

Referring again to FIG. 2, the testing module 212 receives the first throttle position signal 146 from the first throttle position sensor 140. The testing module 212 generates a test signal 216 using the SENT protocol. For purposes of discussion only, each message of the test signal 216 will be discussed as having the predetermined number of pulses generated in the predetermined order described in conjunction with the example signal 302 of FIG. 3. While the principles of the present disclosure are shown and will be described in conjunction with the first throttle position signal 146, the first throttle position sensor 140, and the ECM 120, the present disclosure is equally applicable to other sensors, such as the second throttle position sensor 142, a MAF sensor, an IAT sensor, and/or other types sensors, and to other control modules, such as a transmission control module (TCM), a hybrid control module (HCM) and/or other types of control modules.

The test signal 216 may be used to verify that the HWIO module 204 will diagnose the presence of each of the types of HWIO faults when the test signal 216 displays one or more characteristics that are indicative of the respective types of HWIO faults. More specifically, when the test signal 216 is generated to be indicative of a given type of HWIO fault, the user can monitor the response of the HWIO module 204 to determine whether the HWIO module 204 diagnoses the presence of the given type of HWIO fault.

For example only, the HWIO module 204 may monitor the test signal 216 for the presence of seven different types of faults. The HWIO module 204 may monitor for a greater or fewer number of different types of faults in various implementations. The seven different types of faults may be referred to as: (1) an ECC fault, (2) a pulse too short fault, (3) a pulse too long fault, (4) a clock shift fault, (5) a timeout fault, (6) a too many pulses fault, and (7) a too few pulses fault. Each of the types of faults is discussed below in conjunction with the example of FIG. 6.

The testing module 212 determines a position of the throttle valve 106 based on the first throttle position signal 146. The testing module 212 generates the test signal 216 based on user input 220 and/or the position. The user input 220 may be communicated to the testing module 212 via an input/output (I/O) interface, such as a universal serial bus (USB) interface, via a wireless interface, or another suitable type of interface. The user may make the user input 220 via a device (not shown) that is independent of the testing module 212, such as a computer. In various implementations, the user input 220 may be made directly into the testing module 212 via one or more input/output devices (not shown), such as a display, a keypad, etc. The user input 220 may specify how the test signal 216 should be generated. The testing module 212 generates the test signal 216 according to the user input 220 and provides the test signal 216 to the ECM 120. The testing module 212 is a device that is independent of the ECM 120 and the first throttle position sensor 140.

Figure 4:
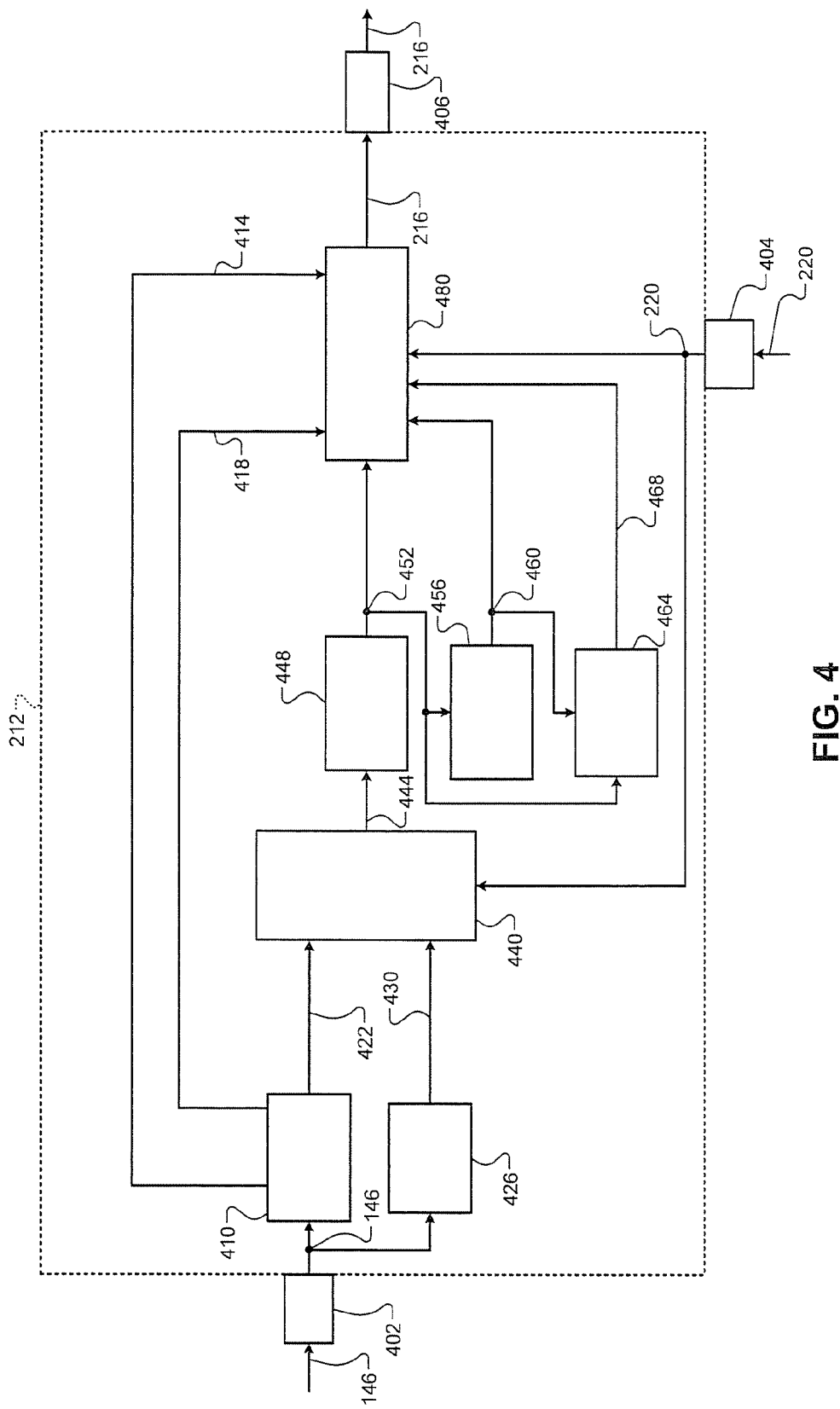
FIG. 4 is a functional block diagram of an example testing module according to the principles of the present disclosure.

Referring now to FIG. 4, a functional block diagram of an example implementation of the testing module 212 is presented. The testing module 212 of FIG. 4 generates the test signal 216 based on the first throttle position signal 146. The testing module 212 is adapted to receive the first throttle position signal 146 and generate the test signal 216 regardless of whether the first throttle position signal 146 is an analog signal or generated based on the SENT protocol (i.e., a SENT based signal). This allows the testing module 212 to be used across various vehicle platforms including vehicle platforms where the first throttle position signal 146 is an analog signal and vehicle platforms where the first throttle position signal 146 is a SENT based signal.

The testing module 212 receives the first throttle position signal 146 at a first input 402. The testing module 212 receives the user input 220 at a second input 404. The testing module 212 outputs the test signal 216 via an output 406.

A decoder module 410 receives the first throttle position signal 146 via the first input 402. The decoder module 410 monitors the first throttle position signal 146 for pulses in the first throttle position signal 146. For each pulse, the decoder module 410 determines whether the pulse was a first, second, third, or fourth pulse in the predetermined order.

The decoder module 410 determines a first throttle position 422 for a given message based on the length of the first half of the nibbles of the third pulse in that message. The decoder module 410 also determines the first throttle position 422 for each other message of the first throttle position signal 146. The first throttle position 422 may be a digital value that is within a predetermined range of values.

The decoder module 410 may also determine a calibration value 414 for each message based on the length of the first pulses of the messages, respectively. The calibration value 414 may be used to replicate the length of the clock cycles of the first throttle position sensor 140 in the test signal 216. The decoder module 410 may also determine a status/communication value 418 for each message based on the length of the second pulses of the messages, respectively. In implementations where the first throttle position signal 146 is an analog signal, the decoder module 410 may set the calibration value 414 and the status/communication value 418 equal to zero.

An analog to digital (A/D) converter 426 selectively samples the first throttle position signal 146, digitizes the first throttle position signal 146, and outputs a second throttle position 430. The second throttle position 430 is a digital value that is within the predetermined range of values. The A/D converter 426 may also filter, buffer, and/or perform one or more actions before outputting the second throttle position 430.

A selection module 440 receives the first throttle position 422 and the second throttle position 430. The selection module 440 outputs one of the first throttle position 422 and the second throttle position 430 as a selected throttle position 444 based on the user input 220. The user input 220 may include more than one piece of information, as discussed further below. The user may select the user input 220 to the selection module 440 with knowledge of whether the first throttle position signal 146 is a SENT based signal or an analog signal. When the first throttle position signal 146 is a SENT based signal, the selection module 440 outputs the first throttle position 422 as the selected throttle position 444. The selection module 440 outputs the second throttle position 430 as the selected throttle position 444 when the first throttle position signal 146 is an analog signal.

An encoder module 448 receives the selected throttle position 444 and determines a set of binary values 452 based on the selected throttle position 444. For example only, the encoder module 448 may determine the set of binary values 452 using a mapping or a function that relates the selected throttle position 444 to the set of binary values 452. The number of binary values in the set of binary values 452 may be equal to half of the predetermined number of nibbles in the third pulse. Each of the binary values corresponds to the length of one of the first, second, and third nibbles of the third pulse.

A complement module 456 determines a set of complement values 460 based on the set of binary values 452. For example only, the complement module 456 may set the set of complement values 460 collectively equal to the one's complement of the set of binary values 452. An ECC module 464 generates ECC 468 based on the set of binary values 452 and the set of complement values 460. For example only, the ECC module 464 may determine the ECC 468 based on the set of binary values 452 and the set of complement values 460 using a seed value of 0101 and the polynomial:

$$x^4+x^3+x^2+1.$$

An output generator module 480 generates the test signal 216 based on the user input 220. The output generator module 480 generates the test signal 216 further based on the set of binary values 452, the set of complement values 460, and the ECC 468. In various implementations, the output generator module 480 may include a programmable interface controller (PIC) or another suitable device or module.

The output generator module 480 may generate the first and second pulses of one message in the test signal 216 based on the calibration value 414 and the status/communication value 418, respectively, if the first throttle position signal 146 is a SENT based signal. If the first throttle position signal 146 is an analog signal, the output generator module 480 may generate the first and second pulses of the message based on the user input 220.

The output generator module 480 may generate the first, second, and third nibbles of the third pulse of the message based on the binary values of the set of binary values 452, respectively. The output generator module 480 may generate the fourth, fifth, and sixth nibbles of the third pulse of the message based on the complement values of the set of complement values 460, respectively. The output generator module 480 may generate the fourth pulse of the message based on the ECC 468.

However, the user input 220 may specify how one or more pulses in the test signal 216 should be generated. An example graphical user interface (GUI) based upon which the user input 220 may be generated is presented in FIG. 5. The user may input one or more replacements and/or selections for generation of the test signal 216 via the GUI, and the user input 220 is generated to reflect the replacements and selections.

The output generator module 480 defaults to generating the test signal 216 based on the user input 220. If one or more characteristics of the test signal 216 are not specified in the user input 220, the output generator module 480 generates the one or more unspecified characteristics in the test signal 216 based on received values, respectively. For example only, the output generator module 480 generates the first pulse in the test signal 216 based on the user input 220 when the user input 220 specifies how the generate the first pulse. If the user input 220 does not specify how to generate the first pulse, however, the output generator module 480 may generate the first pulse in the test signal 216 based on the calibration value 414 or based on a predetermined value.

The output generator module 480 acts similarly with respect to the other characteristics of the test signal 216. For example only, if the user input 220 specifies that one of the pulses in the test signal 216 be omitted, for example to trigger a not enough pulses fault via the HWIO module 204, the output generator module 480 omits one or more pulses from the test signal 216. If the user input 220 specifies that one of the pulses should be longer than the predetermined maximum period, for example to trigger a pulse too long fault via the HWIO module 204, the output generator module 480 maintains one of the pulses in the test signal 216 for longer than the predetermined maximum period.

Figure 5:
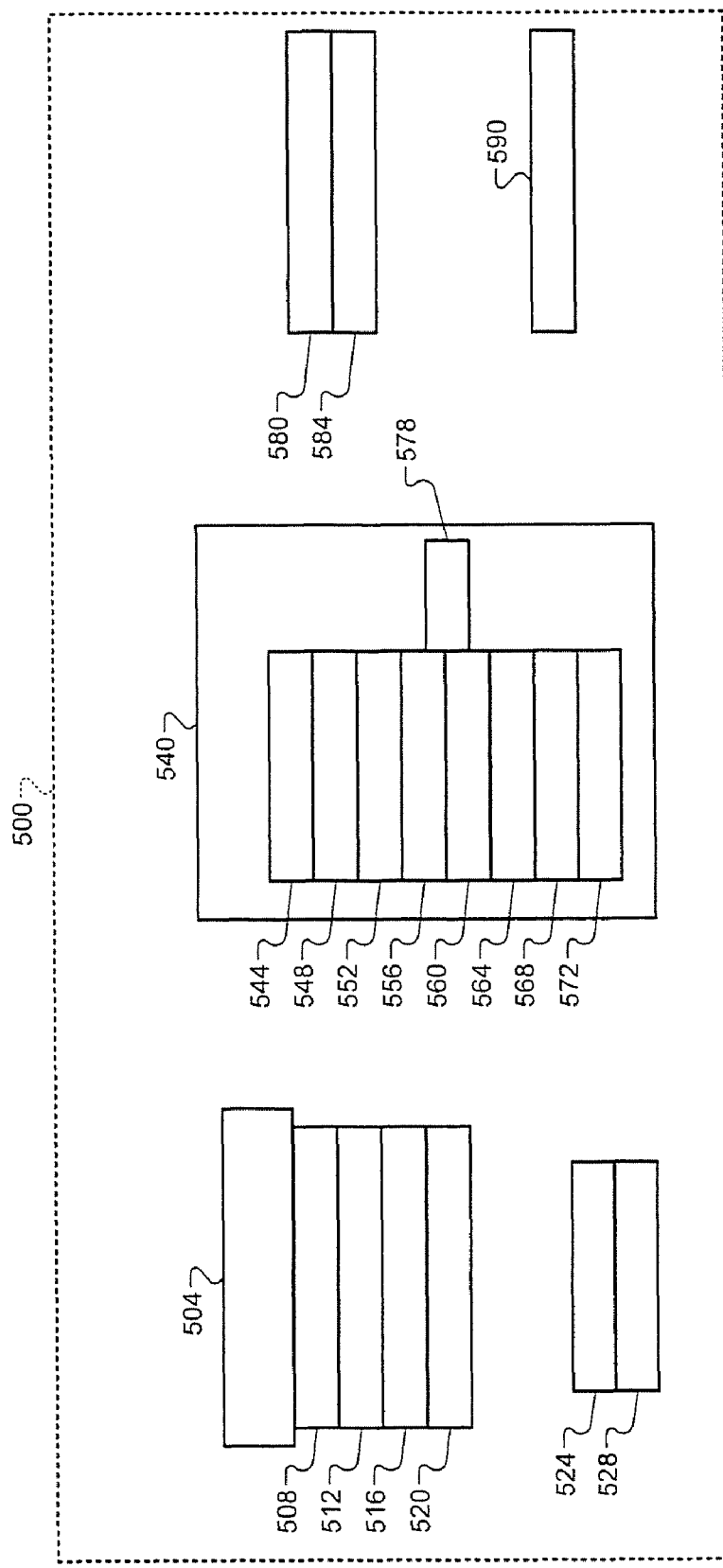
FIG. 5 is an example diagram of a testing graphic user interface (GUI) according to the principles of the present disclosure.

Referring now to FIG. 5, an illustration of an example testing GUI 500 is presented. With continuing reference to FIG. 4, the user input 220 may be generated based on user inputs to the testing GUI 500. The testing GUI 500 may include various fields into which the user may enter a desired value.

For example, the user may enter (e.g., type) a number of nibbles to be generated in the third pulse via a first field 504. The user may enter the length of one clock cycle for the test signal 216 via a second field 508. The user may enter the number of clock cycles for the output generator module 480 to maintain the test signal 216 in the low state after each falling edge via a third field 512. The user may enter the number of clock cycles for the output generator module 480 to maintain the test signal 216 in the high state for a given pulse to convey a value of zero via a fourth field 516. The user may enter the number of clock cycles (corresponding to the predetermined total period) for the output generator module 480 to generally maintain the first pulse in the high state via a fifth field 520. User entries made to the first, second, third, fourth, and fifth fields 504, 508, 512, 516, and 520 may be used for each message of the test signal 216. The user input 220 is generated to reflect entries of the first, second, third, fourth, and fifth fields 504, 508, 512, 516, and 520.

The user may select that the first throttle position signal 146 is an analog signal by selecting a first option 524. The user may select that the first throttle position signal 146 is a SENT based signal by selecting a second option 528. The user input 220 is generated based on the selected one of the first and second options 524 and 528 such that the selection module 440 outputs the first or second throttle position 422 or 430 according to the user's selection.

The testing GUI 500 also includes a fault type selection interface 540 from which the user may select whether the output generator module 480 should manipulate the test signal 216 to be indicative of a HWIO fault. The fault type selection interface 540 may include third, fourth, fifth, sixth, seventh, eighth, ninth, and tenth selectable options 544, 548, 552, 556, 560, 564, 568, and 572, respectively. The user selects one of the third, fourth, fifth, sixth, seventh, eighth, ninth, and tenth selectable options 544, 548, 552, 556, 560, 564, 568, and 572 via the fault type selection interface 540. The user input 220 is generated to reflect the user's selection from the third, fourth, fifth, sixth, seventh, eighth, ninth, and tenth selectable options 544, 548, 552, 556, 560, 564, 568, and 572 of the fault type selection interface 540.

The output generator module 480 generates the test signal 216 to not be indicative of an HWIO fault when the user selects the third option 544. The output generator module 480 generates the test signal 216 to be indicative of a too few pulses fault when the user selects the fourth option 548. When the user selects the fourth option 548, the output generator module 480 generates less than the predetermined number of nibbles in the third pulse of the test signal 216.

The output generator module 480 generates the test signal 216 to be indicative of a too many pulses fault when the user selects the fifth option 552. When the user selects the fifth option 552, the output generator module 480 generates more than the predetermined number of nibbles in the third pulse in the test signal 216.

When the output generator module 480 is generating the test signal 216 to be indicative of too few pulses fault or a too many pulses fault, the ECC value 468 is re-calculated based on the nibbles actually generated in the test signal 216. In this manner, the test signal 216 will be generated based on correct ECC as to not cause the HWIO module 204 to also diagnose the presence of an ECC fault.

The output generator module 480 generates the test signal 216 to be indicative of a timeout fault when the user selects the sixth option 556. When the user selects the sixth option 556, the output generator module 480 generates the test signal 216 such that more than a predetermined timeout period is present between two consecutive first pulses in the test signal 216. The user may enter a percentage or number via an entry field 578. The output generator module 480 may determine or set the period between the two consecutive first pulses in the test signal 216 based on the user's entry into the entry field 578.

The output generator module 480 generates the test signal 216 to be indicative of a clock shift fault when the user selects the seventh option 560. When the user selects the seventh option 560, the output generator module 480 generates the test signal 216 such that a change (i.e., a difference) in length between two consecutive first pulses in the test signal 216 is greater than a predetermined allowable difference. The output generator module 480 may vary the length of consecutive first pulses in the test signal 216 based on the user's entry into the entry field 578.

The output generator module 480 generates the test signal 216 to be indicative of a pulse too long fault when the user selects the eighth option 564. When the user selects the eighth option 564, the output generator module 480 generates the second pulse, one of the nibbles of the third pulse, or the fourth pulse to be longer than the predetermined maximum period.

The output generator module 480 generates the test signal 216 to be indicative of a pulse too short fault when the user selects the ninth option 568. When the user selects the ninth option 568, the output generator module 480 generates the second pulse, one of the nibbles of the third pulse, or the fourth pulse to be shorter than the predetermined minimum period.

The output generator module 480 generates the test signal 216 to be indicative of an ECC fault when the user selects the tenth option 572. When the user selects the tenth option 572, the output generator module 480 sets the length of the fourth pulse based on an ECC that is different than the ECC 468.

The user may select a period for which the output generator module 480 will generate the test signal 216 based on the selected one of the third, fourth, fifth, sixth, seventh, eighth, ninth, and tenth selectable options 544, 548, 552, 556, 560, 564, 568, and 572. For example only, the user may select an all faulty message period via an eleventh option 580 or a short faulty message period via a twelfth option 584. When the twelfth option 584 (i.e., a short faulty message period) is selected, the output generator module 480 may generate the test signal 216 according to the user input 220 for a period. This period is less than a period after which the HWIO module 204 will diagnose a selected type of HWIO fault when test signal 216 exhibits the selected type of HWIO fault. When the eleventh option 580 (i.e., an all faulty message period) is selected, the output generator module 480 may generate the test signal 216 according to the user input 220 until stopped by the user. The user may start and stop the output generator module 480 from generating the test signal 216 based on the user input 220 via a start/stop option 590.

Figure 6:
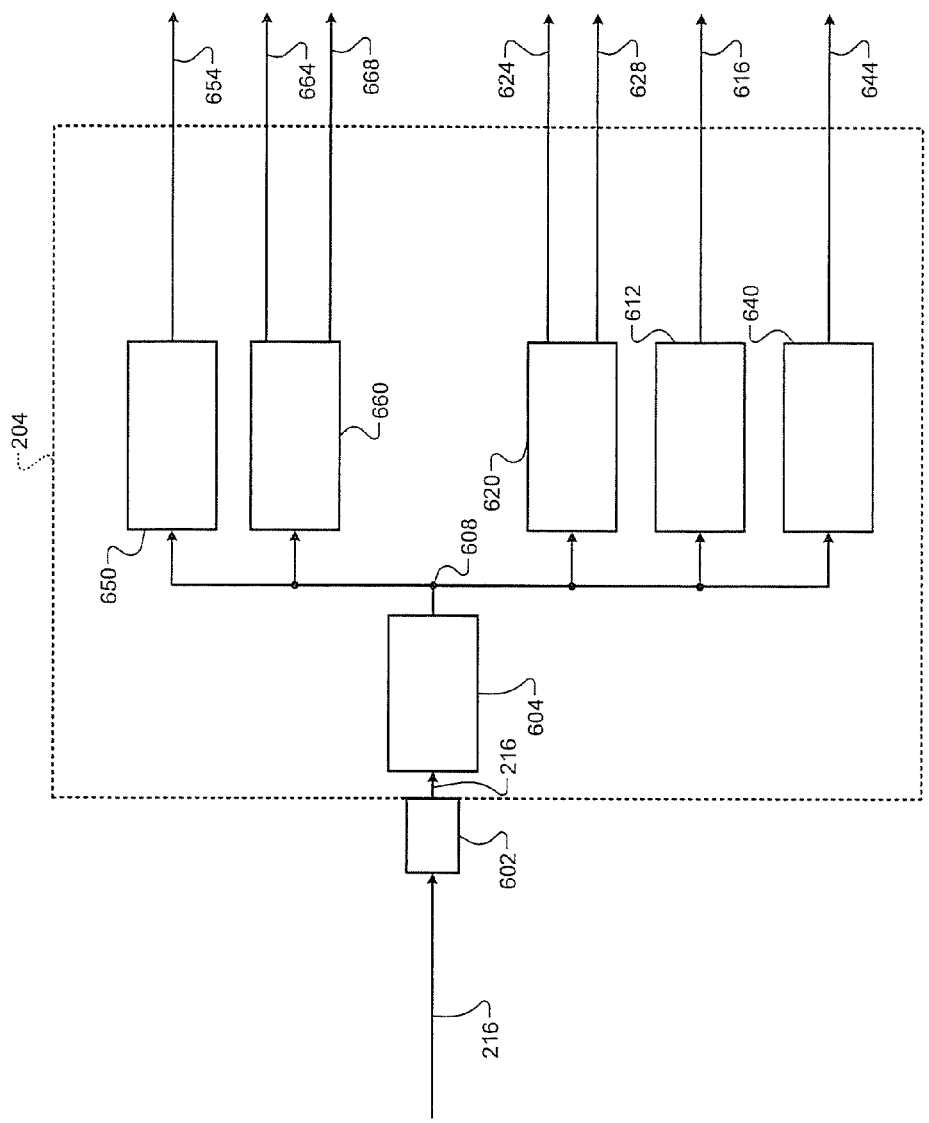
FIG. 6 is a functional block diagram of a hardware input output (HWIO) module according to the principles of the present disclosure.

Referring now to FIG. 6, a functional block diagram of an example implementation of the HWIO module 204 is presented. A normalizing module 604 receives the test signal 216 via an input 602 and outputs a normalized test signal 608 based on the test signal 216. The input 602 may be an input of the ECM 120. The normalizing module 604 receives a first pulse of a message of the test signal 216 and determines a ratio based on the length of the first pulse and a length of a nominal first pulse. For example only, the normalizing module 604 may set the ratio equal to the length of the first pulse divided by the length of the nominal first pulse. The normalizing module 604 may generate the pulses of the message in the normalized test signal 608 by dividing the length of the pulses of the message in the test signal 216 by the ratio. In this manner, the length of the pulses of the message in the normalized test signal 608 reflect the length of the pulses of the message in the test signal 216, adjusted (i.e., normalized) to account for the ratio between the length of the first pulse and the nominal first pulse. The normalizing module 604 performs the normalization for each message of based on the first pulse of each message of the test signal 216.

An ECC checking module 612 selectively diagnoses the presence of an ECC fault based on a comparison of an ECC checking value with the ECC value conveyed via the fourth pulse of the normalized test signal 608. For example only, the ECC checking module 612 may determine the ECC checking value based on the data conveyed via the nibbles of the third pulse of the normalized test signal 608 using a seed value of 0101 and the polynomial:

$$x^4+x^3+x^2+1.$$

If the ECC checking value is different than the ECC value of the fourth pulse, the ECC checking module 612 diagnoses the presence of an ECC fault. The ECC checking module 612 generates an ECC fault signal 616 that indicates whether an ECC fault is present.

A pulse length checking module 620 selectively diagnoses the presence of a pulse too short fault or a pulse too long fault based on the lengths of the second, third, and fourth pulses of the normalized test signal 608 (including each of the nibbles of the third pulse). The pulse length checking module 620 diagnoses the presence of a pulse too short fault when the length of one or more of the pulses is less than the predetermined minimum period. The pulse length checking module 620 diagnoses the presence of a pulse too long fault when the length of one or more of the pulses is greater than the predetermined maximum period. The pulse length checking module 620 generates a short pulse fault signal 624 that indicates whether a pulse too short fault is present. The pulse length checking module 620 generates a long pulse fault signal 628 that indicates whether a pulse too long fault is present.

A clock shift checking module 640 selectively diagnoses the presence of a clock shift fault based on a change in length of the first pulse between two consecutive first pulses in the normalized test signal 608. The clock shift checking module 640 diagnoses that a clock shift fault is present when the change is greater than the predetermined allowable change. For example only, the predetermined allowable change may be approximately 1.56%. The clock shift checking module 640 generates a clock shift fault signal 644 that indicates whether a clock shift fault is present.

A timeout checking module 650 selectively diagnoses the presence of a timeout fault based on the period between the falling edges of two consecutive fourth pulses in the normalized test signal 608. In other words, the timeout checking module 650 selectively diagnoses the presence of a timeout fault based on the period between the beginnings of two consecutive first pulses in the normalized test signal 608. The timeout checking module 650 diagnoses the presence of a timeout fault when the period is greater than the predetermined timeout period. The predetermined timeout period is equal to a maximum length of one message of the test signal 216. For example only, the predetermined timeout period may be 272 clock cycles. The timeout checking module 650 generates a timeout fault signal 654 that indicates whether a timeout fault is present.

A pulse number checking module 660 selectively diagnoses the presence of a too many pulses fault or a not enough pulses fault based on the number of falling edges in the normalized test signal 608 between consecutive first pulses in the normalized test signal 608. In other words, the pulse number checking module 660 selectively diagnoses the presence of a too many pulses fault or a not enough pulses fault based on the number of pulses (including nibbles) in one complete message of the normalized test signal 608. The pulse number checking module 660 diagnoses the presence of a too many pulses fault when the number of falling edges between consecutive first pulses is greater than a predetermined expected number of falling edges. The pulse number checking module 660 diagnoses the presence of a not enough pulses fault when the number of falling edges between consecutive first pulses is less than the predetermined expected number. For example only, the predetermined number of falling edges is 9 when the test signal 216 is generated like the example of FIG. 3. The pulse number checking module 660 generates a too many pulses fault signal 664 that indicates whether a two many pulses fault is present. The pulse number checking module 660 generates a not enough pulses fault signal 668 that indicates whether a not enough pulses fault is present.

The user may monitor the ECC fault signal 616, the short pulse fault signal 624, the long pulse fault signal 628, the clock shift fault signal 644, the timeout fault signal 654, the too many pulses fault signal 664, and the not enough pulses fault signal 668. Based on the status of one or more of these signals when the testing module 212 is generating the test signal 216 to induce a HWIO fault based on the user input 220, the user may verify the responsiveness of the HWIO module 204 to the test signal 216.

Figure 7:
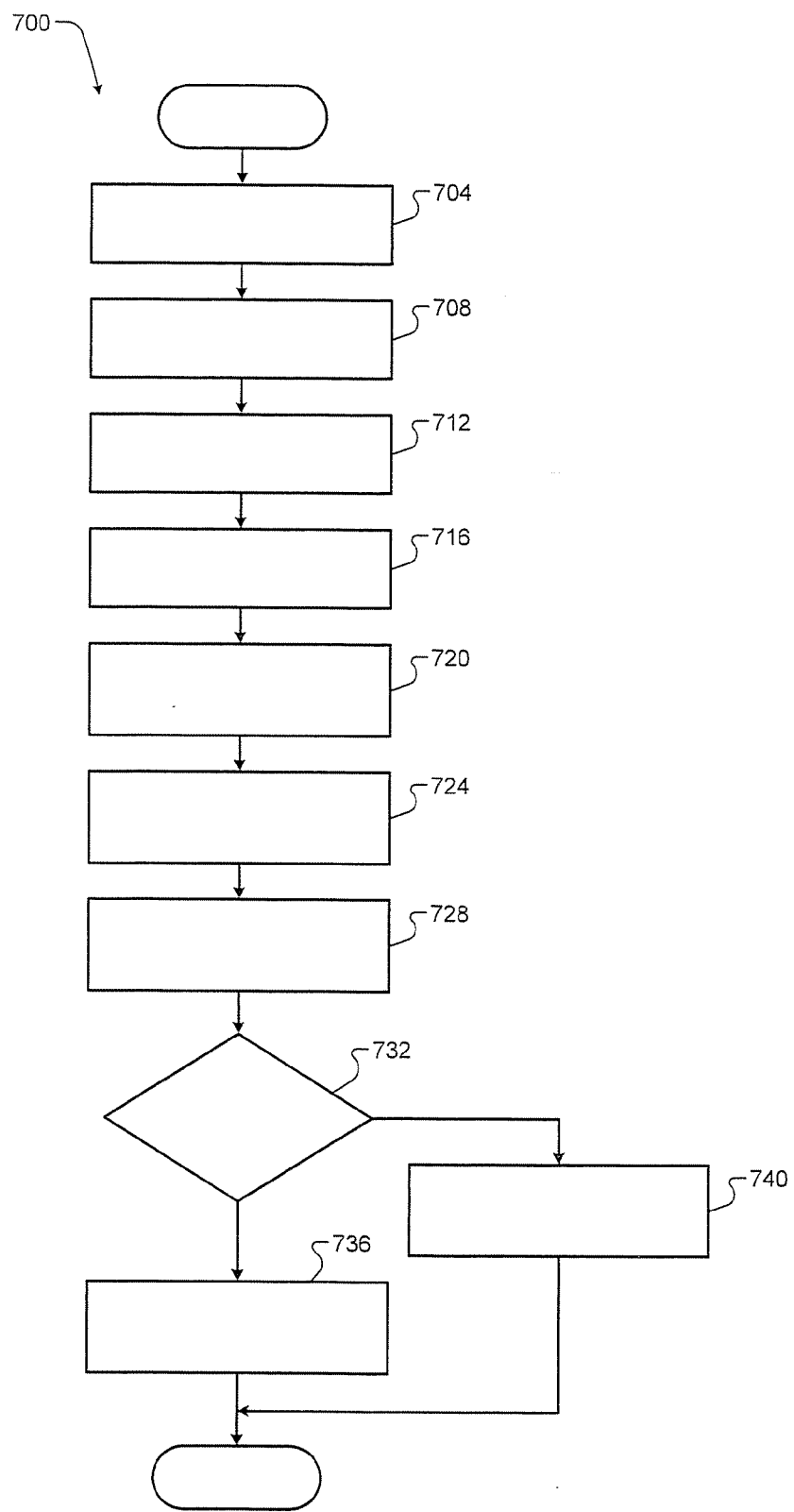
FIG. 7 is a flowchart depicting an example method of generating a test signal according to the principles of the present disclosure.

Referring now to FIG. 7, a flowchart depicting an example method 700 of generating the test signal 216 is presented. Control begins with 704 where control receives the first throttle position signal 146 from the throttle position sensor 140. Control determines the first and second throttle positions 422 and 430 at 708. Control also determines the selected throttle position 444 at 708. Control sets the selected throttle position 444 to one of the first and second throttle positions 422 and 430. Control sets the selected throttle position 444 based on the user input 220.

Control determines the length for the first pulse of a message in the test signal 216 at 712. The length of the first pulse is the number of clock cycles corresponding to the predetermined total period, such as 56 clock cycles. At 716, control determines the length for the second pulse of the message of the test signal 216. Where the first throttle position signal 146 is a SENT based signal, control may extract the length of the second pulse from the first throttle position signal 146.

Control determines the lengths for the first half of the nibbles of the third pulse of the message at 720. Control determines the lengths for the first half of the nibbles based on the selected throttle position 444. More specifically, control determines the set of binary values 452 based on the selected throttle position 444 and determines the lengths based on the binary values, respectively.

Control determines the lengths for the second half of the nibbles of the third pulse of the message at 724. Control determines the set of complement values 460 based on the set of binary values 452, and control determines the lengths based on the complement values, respectively.

Control determines the length for the fourth pulse of the message at 728. Control determines the ECC 468 based on the binary values and the complement values and determines the length of the fourth pulse based on the ECC 468.

At 732, control determines whether to insert the user input 220. If true, control proceeds with 736; if false, control proceeds with 740. Control generates the test signal 216 based on the user input 220 at 736. More specifically, control may adjust or omit one or more of the first, second, third, and fourth pulses of the message in the test signal 216 based on the user input 220. At 740, control generates the first, second, third, and fourth pulses in the predetermined order in the test signal 216 using the lengths determined for the pulses, respectively. Control ends after 736 or 740. While control is shown and discussed as ending, control may instead return to 704.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A testing module comprising:
a first input where the testing module receives a throttle position signal from a throttle position sensor of a vehicle;
a decoder module that generates a first throttle position based on a length of at least one pulse in the throttle position signal;
an analog to digital (A/D) converter that generates a second throttle position based on the throttle position signal;
a second input where the testing module receives user input;
an output generator module that generates a test signal in a single edge nibble transmission (SENT) format based on the user input and one of the first and second throttle positions; and
an output where the testing module outputs the test signal to a control module of the vehicle.

2. A system comprising:
the testing module of claim 1; and
the control module that receives the throttle position signal from the throttle position sensor, that receives the test signal from the testing module, and that selectively diagnoses the presence of a plurality of faults based on the test signal.

3. The testing module of claim 1 wherein the output generator module generates a predetermined number of pulses in the test signal in the SENT format and selectively generates more than the predetermined number of pulses in the test signal in response to the user input.

4. The testing module of claim 1 wherein the output generator module generates a predetermined number of pulses in the test signal in the SENT format and selectively generates less than the predetermined number of pulses in the test signal in response to the user input.

5. The testing module of claim 1 wherein the output generator module generates a pulse in the test signal for greater than a predetermined minimum period in the SENT format and selectively generates the pulse in the test signal for less than the predetermined minimum period in response to the user input.

6. The testing module of claim 1 wherein the output generator module generates a pulse in the test signal for less than a predetermined maximum period in the SENT format and selectively generates the pulse in the test signal for greater than the predetermined maximum period in response to the user input.

7. The testing module of claim 1 wherein the output generator module changes a length of a pulse in the test signal by more than a predetermined amount between consecutive messages of the test signal in response to the user input.

8. The testing module of claim 1 wherein the output generator module changes a period between a pulse in consecutive messages of the test signal to greater than a predetermined period in response to the user input.

9. The testing module of claim 1 further comprising an error correcting code (ECC) module that determines a first ECC based on the one of the first and second throttle positions,
wherein the output generator module generates a pulse in the test signal based on second ECC that is different than the first ECC in response to the user input.

10. The testing module of claim 1 further comprising an error correcting code (ECC) module that determines a first ECC based on the one of the first and second throttle positions,
wherein the output generator module, in response to the user input, selectively:
(i) generates a first pulse in the test signal based on second ECC that is different than the first ECC;
(ii) generates more than a predetermined number of pulses in the test signal;
(iii) generates less than the predetermined number of pulses in the test signal;
(iv) generates a second pulse having less than a predetermined minimum period in the test signal;
(v) generates a third pulse having greater than a predetermined maximum period in the test signal;
(vi) changes a length of a fourth pulse in the test signal by more than a predetermined amount between consecutive messages of the test signal; and
(vii) changes a period between a fifth pulse in consecutive messages of the test signal to greater than a predetermined period.

11. A method comprising:
receiving a throttle position signal from a throttle position sensor of a vehicle at a first input of a testing module;
generating a first throttle position based on a length of at least one pulse in the throttle position signal using the testing module;
generating a second throttle position based on the throttle position signal using the testing module;
receiving user input at a second input of the testing module;
generating a test signal in a single edge nibble transmission (SENT) format based on the user input and one of the first and second throttle positions; and
outputting the test signal to a control module of the vehicle at an output of the testing module.

12. The method of claim 11 further comprising:
receiving the throttle position signal using the control module;
receiving the test signal using the control module; and
selectively diagnosing the presence of a plurality of faults based on the test signal using the control module.

13. The method of claim 11 further comprising:
generating a predetermined number of pulses in the test signal in the SENT format; and
selectively generating more than the predetermined number of pulses in the test signal in response to the user input.

14. The method of claim 11 further comprising:
generating a predetermined number of pulses in the test signal in the SENT format; and
selectively generating less than the predetermined number of pulses in the test signal in response to the user input.

15. The method of claim 11 further comprising:
generating a pulse in the test signal for greater than a predetermined minimum period in the SENT format; and
selectively generating the pulse in the test signal for less than the predetermined minimum period in response to the user input.

16. The method of claim 11 further comprising:
generating a pulse in the test signal for less than a predetermined maximum period in the SENT format; and
selectively generating the pulse in the test signal for greater than the predetermined maximum period in response to the user input.

17. The method of claim 11 further comprising changing a length of a pulse in the test signal by more than a predetermined amount between consecutive messages of the test signal in response to the user input.

18. The method of claim 11 further comprising changing a period between a pulse in consecutive messages of the test signal to greater than a predetermined period in response to the user input.

19. The method of claim 11 further comprising:
determining a first error correcting code (ECC) based on the one of the first and second throttle positions; and
generating a pulse in the test signal based on second ECC that is different than the first ECC in response to the user input.

20. The method of claim 11 further comprising:
determining a first error correcting code (ECC) based on the one of the first and second throttle positions; and,
in response to the user input, selectively:
   (i) generating a first pulse in the test signal based on second ECC that is different than the first ECC;
   (ii) generating more than a predetermined number of pulses in the test signal;
   (iii) generating less than the predetermined number of pulses in the test signal;
   (iv) generating a second pulse having less than a predetermined minimum period in the test signal;
   (v) generating a third pulse having greater than a predetermined maximum period in the test signal;
   (vi) changing a length of a fourth pulse in the test signal by more than a predetermined amount between consecutive messages of the test signal; and
   (vii) changing a period between a fifth pulse in consecutive messages of the test signal to greater than a predetermined period.

* * * * *